United States Patent

Blanchard et al.

[15] 3,682,924
[45] Aug. 8, 1972

[54] READILY PROCESSABLE, RIGID VINYL CHLORIDE POLYMER COMPOSITIONS CONTAINING CHLORINATED OLEFIN POLYMER WAX

[72] Inventors: Robert R. Blanchard, Port Allen, La. 70767; Warren L. Young, Baton Rouge, La. 70815

[73] Assignee: The Dow Chemical Company, Midland, Mich.

[22] Filed: Feb. 10, 1971

[21] Appl. No.: 114,384

Related U.S. Application Data

[63] Continuation-in-part of Ser. No. 767,485, Oct. 14, 1968, abandoned, which is a continuation-in-part of Ser. Nos. 560,975, June 6, 1966, abandoned, and Ser. No. 544,115, Aug. 21, 1966, abandoned.

[52] U.S. Cl. ..........................260/28.5 D, 260/897 C
[51] Int. Cl. ................................................C08f 45/30
[58] Field of Search .260/28.5 D, 897 C, 899, 94.9 H

[56] References Cited

UNITED STATES PATENTS 3,459,692   8/1969   Buning...................260/897 C
3,242,234   3/1966   Frey........................260/897 C
3,407,171   10/1968  Segre.....................260/897 C

FOREIGN PATENTS OR APPLICATIONS 626,534   8/1961   Canada

*Primary Examiner*—Morris Liebman
*Assistant Examiner*—P. R. Michl
*Attorney*—Griswold & Burdick, Ronald G. Brookens and Albin R. Lindstrom

[57] ABSTRACT

This invention relates to essentially rigid thermoplastic vinyl chloride polymer compositions which can be easily fabricated into articles such as extrusion blown bottles having exceptional clarity and surface smoothness which compositions are comprised essentially of 100 parts by weight of a vinyl chloride polymer in intimate admixture with between about 0.3 and 10 parts by weight of a chlorinated olefin wax having a molecular weight of from about 1,500 to 5,500 and which contain between about 20 and 50 weight percent of chemically combined chlorine.

6 Claims, No Drawings

READILY PROCESSABLE, RIGID VINYL CHLORIDE POLYMER COMPOSITIONS CONTAINING CHLORINATED OLEFIN POLYMER WAX

This application is a continuation-in-part of copending application Ser. No. 767,485 filed Oct. 14, 1968, now abandoned, which is in turn a continuation-in-part of the now abandoned applications Ser. No. 560,975, filed June 6, 1966 and Ser. No. 544,115 filed Aug. 21, 1966.

BACKGROUND

For many purposes, there is an advantage to preparing rigid or essentially rigid fabricated products from vinyl halide polymers. However, due to the sensitive nature of vinyl halide polymer to heat, serious problems have been encountered in fabricating articles therefrom. Particularly troublesome difficulties are often encountered when fabricating such polymers utilizing conventional fabrication processes, such as calendaring, extrusion, extrusion blowing and the like, wherein molten vinyl halide polymer adheres to the heated metal surfaces of the fabrication equipment resulting in articles having undesirable surface irregularities.

It is the primary object of the present invention to provide essentially rigid, thermoplastic compositions comprising vinyl halide polymers containing certain chlorinated olefin waxes which significantly enhance the processability of the polymer compositions without adversely affecting the physical properties thereof while providing articles having excellent surface smoothness.

Other and related objects will become apparent from the following specification and claims.

SUMMARY OF THE INVENTION

These objects are realized, according to the invention, by forming a composition comprising an intimate admixture of:

1. a vinyl chloride polymer containing at least about 95 weight percent of polymerized vinyl chloride in the polymer molecule with the remainder being at least one monoethylenically unsaturated comonomer; and
2. between about 0.3 and 10 parts per 100 parts of vinyl chloride polymer of a chlorinated olefin wax having an average molecular weight of between about 1,500 and 5,500 which contains from about 20 to 50 weight percent of chemically combined chlorine.

These compositions, when employed in molten form in any conventional fabrication process, are essentially free from adhesion to the metal surfaces of the fabrication equipment. As a result, shaped articles are produced having excellent surface characteristics and appearance, i.e., surfaces which are essentially free from undesirable ridges, grooves, and other irregularities. Use of such compositions further provides significantly enhanced fabrication efficiency, particularly when extruding and blow-molding the same into articles such as bottles and the like. In addition to possessing excellent processability, the compositions of the present invention, and shaped articles formed therefrom, are characterized by tensile modulus, heat distortion properties and clarity which are comparable to conventionally prepared rigid thermoplastic vinyl chloride polymer compositions.

DESCRIPTION OF PREFERRED EMBODIMENTS

The vinyl chloride polymer constituent of the polymer blends may be any rigid or essentially rigid vinyl chloride polymer such as vinyl chloride homopolymers and interpolymers of vinyl chloride with interpolymerizable monomers such as vinyl esters of organic acids containing one to 18 carbon atoms, e.g., vinyl acetate, vinyl stearate, and so forth; vinylidene chloride; symmetrical dichloroethylene; acrylonitrile, methacrylonitrile, alkyl acrylate esters in which the alkyl group contains one to eight carbon atoms, e.g., methyl acrylate and butyl acrylate; the corresponding alkyl methacrylate esters; dialkyl esters of dibasic organic acids in which the alkyl groups contain one to eight carbon atoms, e.g., dibutyl fumarate, diethyl maleate, and so forth. In general, where vinyl chloride interpolymers are employed, they should contain at least about 95 weight percent of vinyl chloride.

The chlorinated olefin waxes employed in the present invention may be generally described as those chlorination products containing at least about 90 mole percent ethylene in the molecule with the remainder being one or more ethylenically unsaturated comonomers, such waxes having an average molecular weight of between about 1,500 and 5,500 as determined by procedures such as described in Sperati et al., Journal of American Chemical Society, 75, 6129 (1953), and which contain from between about 20 and 50 weight percent of chemically combined chlorine. Further, it has been unexpectedly discovered, which discovery forms part of the present invention, that the preferred concentration of such chlorinated olefin waxes varies with the chlorine content thereof, and with the physical properties of the wax, e.g., hardening, but is relatively unaffected by the average molecular weight thereof providing such molecular weight is between the herein prescribed limits.

In this regard, it has been found that the following concentrations of olefin waxes of specified chlorine content are particularly useful for the purposes of the present invention: from about 0.3 to 3 parts by weight (per 100 parts of vinyl chloride polymer) of an olefin wax containing from about 20 to 25 weight percent of chemically combined chlorine; from about 1 to 4 parts by weight of an olefin wax containing from about 25 to 30 percent chlorine; and from about 3 to 10 parts by weight of an olefin wax containing from about 30 to 50 percent chlorine.

The vinyl chloride polymer compositions of the invention may be formulated and prepared in any conventional manner, as by dry blending the ingredients and milling them at elevated temperatures of between about 150° and 200° C., with conventionally employed compounding and milling rolls and the like apparatus. Such compositions are particularly useful for the provision of molten or extruded articles or otherwise shaped or fabricated articles of the rigid, chemically resistant type such as pipes and tubing and particularly for blown bottles and the like articles.

It is further to be pointed out that other ingredients such as pigments and stabilizers may be incorporated into the compositions of the present invention. Exemplary of particularly useful stabilizers are the sulfur containing organo tin compounds including the alkyl tin mercaptides, among many others known in the art. Such stabilizers are preferably used in amounts between about 1 and 4 parts by weight per 100 parts of the vinyl chloride polymer constituent of the present invention.

The following examples wherein all parts and percentages are to be taken by weight, illustrate the present invention but are not to be construed as limiting its scope.

EXAMPLE 1

In each of a series of experiments, the following specified ingredients were individually admixed in a Waring Blendor and extruded from a two-stage, one inch extruder operating about 44 rpm while employing a first stage cylinder temperature of about 350° F. and a second stage cylinder temperature of about 410° F. Individual rod-shaped test samples were obtained by extrusion through a single 0.275 × 1.25 inch cylindrical die.

The following Table I illustrates the advantages of utilizing the specified chlorinated polyolefin waxes as processing aids for polyvinyl chloride.

The formulations tested contained the following specified ingredients: 100 parts by weight of a polyvinyl chloride having an absolute viscosity in 2 percent o-dichlorobenzene solution at 120° C., of 1.60 to 180 cps; 2.5 parts per 100 parts of polyvinyl chloride of a commercially available alkyl tin mercaptide; and 0 and 0.4 part, per 100 parts of polyvinyl chloride, of a chlorinated polyethylene wax having an average molecular weight of about 3,500 and a chlorine content of between about 25 and 40 weight percent.

The data of Table I illustrate the unexpected improvement in processability obtained by utilization of the amounts and types of chlorinated polyethylene wax as specified by the present invention; whereas the data of Table II illustrate that utilization of such chlorinated wax in the prescribed amounts does not deleteriously effect the physical properties of the vinyl chloride polymer compositions.

It is to be further understood that the present invention contemplates the utilization of one or more conventionally employed resinous impact strength modifiers which are compatible with the defined vinyl chloride polymers in amounts generally between about 5 and 50 parts of each modifier per 100 parts of vinyl chloride polymer. Particularly useful impact strength modifiers include the graft copolymers of styrene-acrylonitrile or styrene isobutylene-acrylonitrile mixtures upon butadiene such as disclosed and claimed in the U.S. Pat. No. 2,802,809 issued Aug. 13, 1957. Other useful impact strength modifiers are the chlorinated polyethylenes and the thermoplastic acrylic polymers and the graft copolymers of styrene-methylmethacrylate upon butadiene.

It has been found that the presence of such impact modifiers tends generally to increase the amount of chlorinated olefin wax required for obtainment of optimum results. In any event, however, the critical concentrations of such chlorinated olefin waxes will fall within the limits prescribed.

TABLE I

| Run No. | Composition CPE Wax Parts by wt. | % Cl | Processability Current Req. (amp) for ext. | Ext. Rate (lbs./hr.) | Extrudate Appearance Clarity | Surface |
|---|---|---|---|---|---|---|
| For Comparison | | | | | | |
| 1 | 0 | – | 12.5 | 7.7 | Poor* | Rough |
| 2 | 0.1 | 25 | 9.6 | 6.6 | Poor | Rough |
| 3 | 0.2 | 25 | 9.2 | 5.2 | Poor | Rough |
| The Invention | | | | | | |
| 4 | 0.3 | 25 | 9 | 7.3 | Excellent | Smooth |
| 5 | 0.3 | 28 | 11 | 10.2 | Excellent | Smooth |
| 6 | 0.4 | 40 | 10 | 11.1 | Excellent | Smooth |

*Poor clarity due to poor surface characteristics

The following Table II illustrates the effects of the addition of 0.3 part by weight of the chlorinated polyethylene wax of Example I (Run No. 4) on the physical properties of the polyvinyl chloride composition.

TABLE II

| Run No. | CPE Wax Parts by Wt. | % Cl | Tensile % TL psi × 10³ | Elong. | Heat Dist. Temp. °F. |
|---|---|---|---|---|---|
| For Comparison | | | | | |
| 7 | – | – | 6.8 | 148 | 179 |
| The Invention | | | | | |
| 8 | 0.3 | 25 | 6.8 | 157 | 179 |

EXAMPLE 2

In each of a series of experiments, individual formulations containing the following types and amounts of ingredients were individually admixed in a Waring Blendor and extruded from a two-stage, one inch extruder operating about 44 rpm while employing a first stage cylinder temperature of about 350° F. and a second stage cylinder temperature of about 410° F. Individual rod-shaped test samples were obtained in each instance by extrusion through a single 0.275 diameter × 1.25 inch cylindrical die.

FORMULATION INGREDIENTS

100 Parts by weight of polyvinyl chloride having an absolute viscosity in 2 percent o-dichlorobenzene solution at 120° C., of 1.90 to 2.05 cps; 2.5 parts per 100 parts of polyvinyl chloride of an alkyl tin mercaptide stabilizer; 20 parts per 100 parts of polyvinyl chloride of a commercially available graft copolymer of styrene-acrylonitrile upon butadiene having about 49 weight percent styrene, 21 weight percent acrylonitrile, and 30 weight percent butadiene; and the designated amounts and types of chlorinated olefin waxes as specifically set forth in the following Table III.

TABLE III

Series I: CPE waxes having an average molecular weight of from 1500 to 5500

| % Cl | CPE WAX Pts. by Wt. | Appearance of Extrudate Surface |
|---|---|---|
| 10 | 0 – 0.4 | Rough |
| 20 to 50 | 0.3 to 10 | Smooth |
| 20 to 50 | >10 | Lumpy |

Series II:   CPE having an average molecular weight of
(For         from 6000 to 30,000
Comparison)

| % Cl | CPE Pts. by Wt. | Appearance of Extrudate Surface |
|---|---|---|
| 20 to 50 | 0 to 10 | Lumpy to Rough |

Series III:  CPE wax having a molecular weight of about
(For         1000 (formulation without Impact
             Modifier
Comparison)

| % Cl | CPE WAX Pts. by Wt. | Appearance of Extrudate Surface |
|---|---|---|
| 70 | 0 – 1.8 | Rough |

Series IV:   Polyethylene wax having a molecular weight
(For         between 2000 and 10,000 (formulation without
Comparison)  impact modifier)

| PE (Pts. by Wt.) | Mol. Wt. | Appearance of Extrudate Surface |
|---|---|---|
| 0 | — | Rough-Opaque |
| 1.8 | 2000 | Rough-Opaque |
| 1.8 | 10,000 | Rough-Opaque |

The above data illustrate the criticality of using chlorinated olefin waxes of the type as specifically disclosed herein. More particularly such data show that the chlorinated olefin waxes are required to achieve the required balance of enhanced processability and surface smoothness as contrasted to the use of the designated comparative materials.

In yet other experiments, of the nature as specifically described in Example 2, it was determined that the following concentrations and types of chlorinated olefin waxes provided the optimum beneficial results from about 0.3 to 3 parts by weight (per 100 parts of polyvinyl chloride) of an olefin wax containing from about 10 to 25 weight percent of chemically combined chlorine; from about 1 to 4 parts by weight of an olefin wax containing from about 25 to 30 percent chlorine; from about 3 to 10 parts by weight of an olefin wax containing from about 30 to 50 percent chlorine.

What is claimed is:

1. An essentially rigid, easily processable thermoplastic composition comprising:
   a. a vinyl chloride polymer containing at least about 95 weight percent of polymerized vinyl chloride in the polymer molecule with the remainder being at least one monoethylenically unsaturated comonomer;
   b. between about 0.3 and 10 parts by weight per 100 parts of said vinyl chloride polymer of a chlorinated polyethylene wax having an average molecular weight from about 1,500 to 5,500 and which contains between about 20 to 50 weight percent of chemically combined chlorine.

2. The composition of claim 1 wherein said vinyl chloride polymer is polyvinyl chloride.

3. The composition of claim 2 wherein said chlorinated polyethylene wax is present in an amount of between about 0.3 and 3 parts by weight when said wax contains from about 20 to 25 weight percent chlorine, between about 1 to 4 parts by weight when said wax contains from about 25 to 30 percent chlorine, between about 3 to 10 parts by weight when said wax contains from about 30 to 50 percent chlorine.

4. An essentially rigid, readily processable, thermoplastic shaped article having smooth surfaces comprising an intimate fusion blend of:
   a. a vinyl chloride polymer containing at least about 95 weight percent of polymerized vinyl chloride in the polymer molecule with the remainder being at least one monoethylenically unsaturated comonomer, and
   b. between about 0.3 and 10 parts by weight per 100 parts of said vinyl chloride polymer of a chlorinated polyethylene wax having a molecular weight of from about 1500 to 5500 and which contains between about 20 and 50 weight percent of chemically combined chlorine.

5. The article of claim 4 wherein said vinyl chloride polymer is polyvinyl chloride.

6. The article of claim 4 wherein said chlorinated polyethylene wax is present in an amount of between about 0.3 to 3 parts by weight when said wax contains from about 20 to 25 weight percent chlorine, between about 1 to 4 parts by weight when said wax contains from about 25 to 30 percent chlorine, between about 3 to 10 parts by weight when said wax contains from about 30 to 50 percent chlorine.

* * * * *